(12) United States Patent
Hardway et al.

(10) Patent No.: US 9,484,784 B2
(45) Date of Patent: Nov. 1, 2016

(54) ELECTRIC MOTOR SYSTEMS AND METHODS

(71) Applicants: Trevor Hardway, Midland, TX (US); Michael Salerno, Hereford, AZ (US); Ronald David Wallin, Midland, TX (US)

(72) Inventors: Trevor Hardway, Midland, TX (US); Michael Salerno, Hereford, AZ (US); Ronald David Wallin, Midland, TX (US)

(73) Assignee: HENRY RESEARCH AND DEVELOPMENT, LLC, Midland, TX (US)

( * ) Notice: Subject to any disclaimer, the term of this patent is extended or adjusted under 35 U.S.C. 154(b) by 286 days.

(21) Appl. No.: 14/149,290

(22) Filed: Jan. 7, 2014

(65) Prior Publication Data

US 2014/0191602 A1    Jul. 10, 2014

Related U.S. Application Data

(60) Provisional application No. 61/749,475, filed on Jan. 7, 2013.

(51) Int. Cl.
| | |
|---|---|
| *H02K 5/12* | (2006.01) |
| *H02K 17/00* | (2006.01) |
| *H02K 5/132* | (2006.01) |
| *E21B 43/12* | (2006.01) |

(52) U.S. Cl.
CPC ............. *H02K 5/132* (2013.01); *E21B 43/128* (2013.01); *H02K 2213/03* (2013.01); *H02K 2213/09* (2013.01)

(58) Field of Classification Search
CPC ..... H02K 5/132; H02K 1/27; H02K 2213/03
USPC ............................................ 310/87
See application file for complete search history.

(56) References Cited

U.S. PATENT DOCUMENTS

| | | | | |
|---|---|---|---|---|
| 4,831,301 A * | 5/1989 | Neumann | ................ | H02K 1/16 310/184 |
| 5,146,982 A * | 9/1992 | Dinkins | ................ | E21B 17/206 166/65.1 |
| 6,224,355 B1 * | 5/2001 | Forthuber | ............. | E21B 43/122 417/423.3 |
| 2007/0096571 A1 * | 5/2007 | Yuratich | ................ | E21B 43/128 310/87 |
| 2007/0224056 A1 * | 9/2007 | Watson | ................. | E21B 43/128 417/414 |
| 2009/0015080 A1 * | 1/2009 | Vollmer | ................... | H02K 3/28 310/51 |

\* cited by examiner

*Primary Examiner* — Joshua Benitez-Rosario
*Assistant Examiner* — Leda Pham
(74) *Attorney, Agent, or Firm* — Winstead PC

(57) ABSTRACT

Electric motor systems and methods may provide highly efficient operation. The electric motor systems and methods discussed herein provide an oil filled motor that is low speed and utilizes permanent magnets. The electric motor may utilize a large number of poles and fractional slot design. Further, in some embodiments, the electric motor systems and methods may be suitable for use downhole.

21 Claims, 9 Drawing Sheets

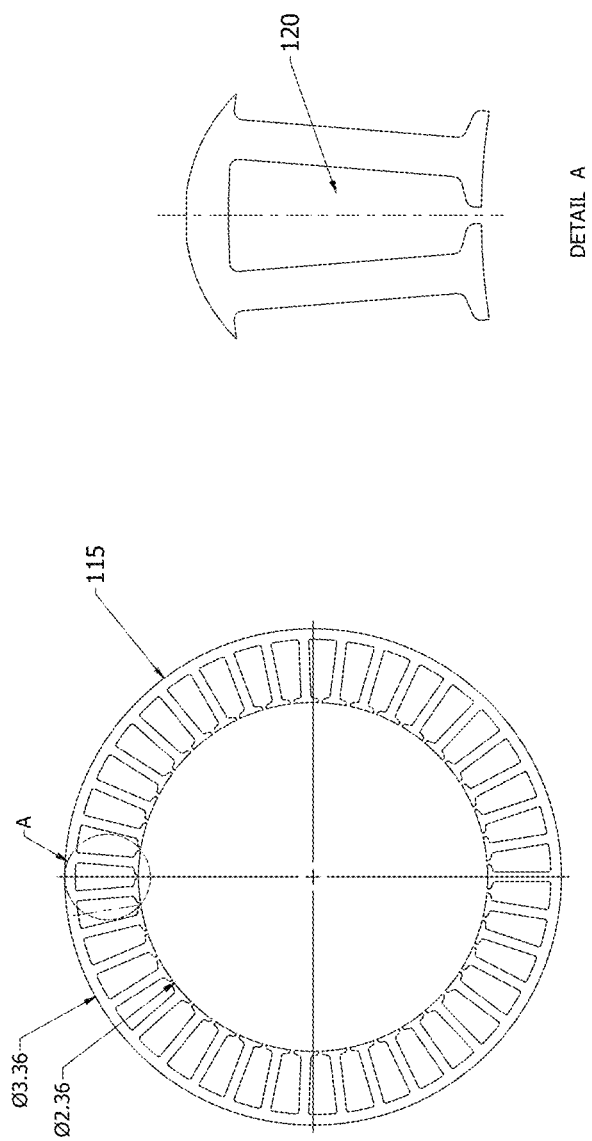

(Optional)

100 Linear Pump

ELECTRIC MOTOR SYSTEMS AND METHODS

RELATED APPLICATIONS

This application claims the benefit of U.S. Provisional Patent Application No. 61/749,475 to Hardway et al., filed on Jan. 7, 2013, which is incorporated herein by reference.

FIELD OF THE INVENTION

This invention relates to electric motor systems and methods. More particularly, to electric motors that are capable of operating in a downhole environment.

BACKGROUND OF INVENTION

Electric motors may be utilized downhole for various operations. However, not all electric motors are suitable for downhole environments. In harsh downhole environments, electric motors may be exposed to high pressure, high temperatures, fluids, mud, and other conditions that may impact operation of the motor.

One example of motors utilized downhole are electric motors utilized in Electrical submersible pumps (ESPs) for pumping fluids from wells or the like. ESPs are centrifugal pumps that may be placed into a well to pump fluids. Due to inherent motor inefficiencies, some ESP motors may require a minimum flow rate or speed of fluid moving past the motor housing to prevent the motor from overheating. Additionally, the size of ESPs may be increased in order to compensate for motor inefficiencies by adding surface area to dissipate heat, but the resulting size of the ESP may be cumbersome.

In order to provide an electric motor that is suitable for use in downhole environment, electric motor systems and methods that provide low speed, permanent magnet motors that are sealed and oil filled are proposed. The electric motor systems and methods discussed herein are highly efficient.

SUMMARY OF THE INVENTION

In one embodiment, an electric motor system and method provide a permanent magnet motor. In some embodiments, the motor may be a 12 pole and 39 slot motor with 13 coils per phase. In some embodiments, the motor may be an 8 pole and 27 slot motor with 9 coils per phase. The windings may be positioned on the stator of the motor. In some embodiments, the rotor may provide 12 magnets disposed on the outer circumference of the rotor. In some embodiments, the motor may provide a sealed lubricant chamber. In some embodiments, the motor may further provide a pressure compensation device that minimizes a pressure differential between a lubricant in the lubricant chamber and external fluids or gases.

In some embodiments, the motor may have a length of approximately 7 feet or less. In some embodiments, the diameter of the motor may be approximately 3¾ inches. In some embodiments, the electric motor is capable of providing 50 ft-lb of torque or greater. In some embodiments, the electric motor operates at rpms up to or equal to 3600 rpm. In some embodiments, the motor is suitable for operation at approximately 380 V. In some embodiments, the motor may be suitable for operation at approximately 10-12 amps.

In yet another embodiment, the electric motor may be suitable for downhole operations. In some embodiments, the motor may be suitable for use in a linear pump. In some embodiments, the motor may be suitable for use at depths equal to or between 2,500 to 15,000 feet. In some embodiments, the motor may be suitable for deviated wells, horizontal wells, or the like.

The foregoing has outlined rather broadly various features of the present disclosure in order that the detailed description that follows may be better understood. Additional features and advantages of the disclosure will be described hereinafter.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein:

FIGS. 3A-3B are illustrative embodiments of a stack of a stator assembly;

DETAILED DESCRIPTION

Figure 1A:
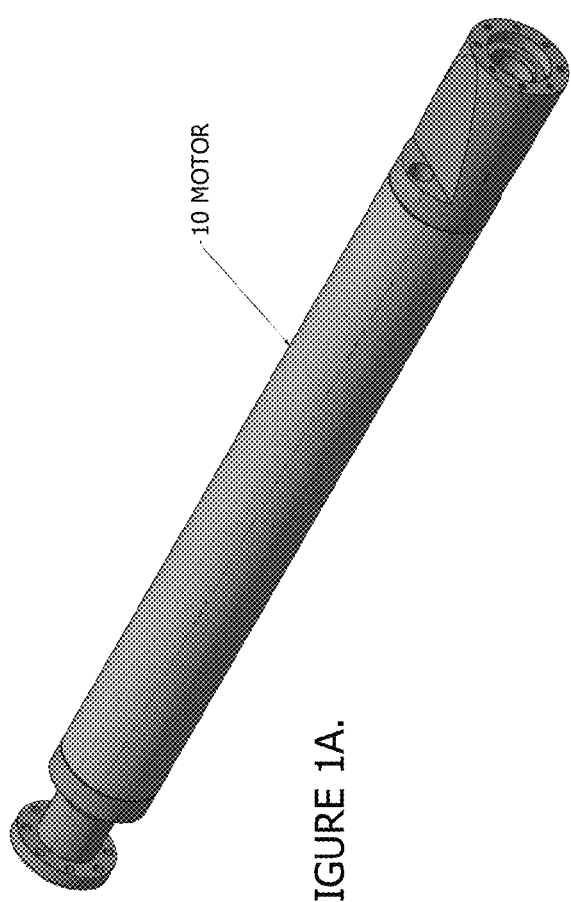
FIGS. 1A-1B are illustrative embodiments of an electric motor.

Refer now to the drawings wherein depicted elements are not necessarily shown to scale and wherein like or similar elements are designated by the same reference numeral through the several views.

Referring to the drawings in general, it will be understood that the illustrations are for the purpose of describing particular implementations of the disclosure and are not intended to be limiting thereto. While most of the terms used herein will be recognizable to those of ordinary skill in the art, it should be understood that when not explicitly defined, terms should be interpreted as adopting a meaning presently accepted by those of ordinary skill in the art.

It is to be understood that both the foregoing general description and the following detailed description are exemplary and explanatory only, and are not restrictive of the invention, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

Figure 1B:
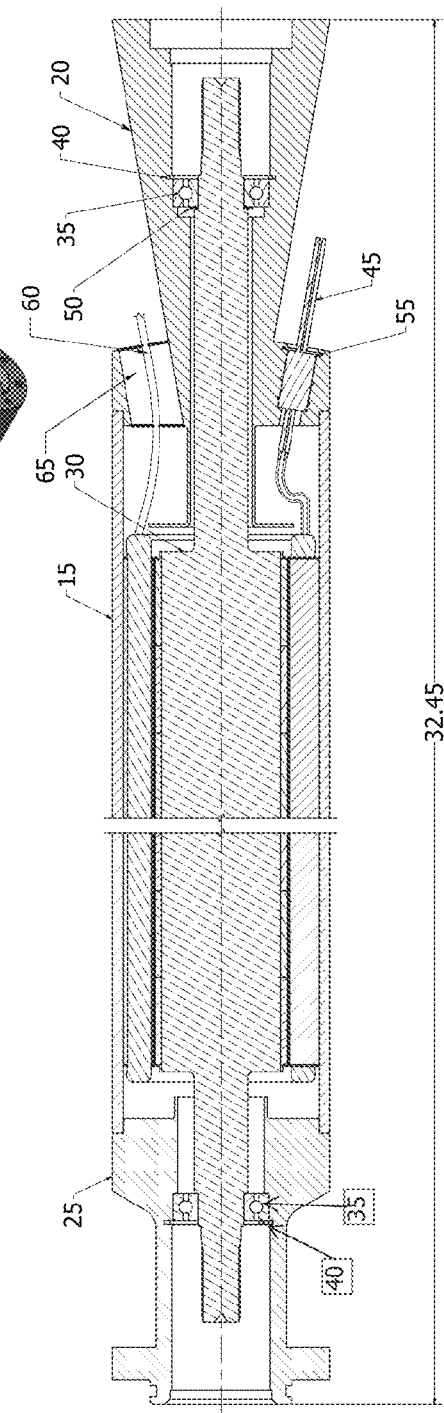

FIGS. 1A-1B are illustrative embodiments of an electric motor 10. The stator surrounds the rotor and remains stationary. In a permanent magnet motor, magnets may be housed by the stator. The rotor is disposed within the stator and may rotate in response to a magnetic field. The electric motor 10 may comprise a stator/housing assembly 15, motor head 20, motor base 25, magnet assembly 30, bearing(s) 35, snap ring(s) 40, cables 45 & 60, washer 50, and snap ring 55. Stator/housing assembly 15 may secure and protect internal components of the electric motor 10. Stator/housing assembly 15 may be coupled to a motor head 20 and/or motor base 25, which may also secure and protect portions of electric motor 10. In some embodiments, the outer diameter of stator/housing assembly 15 or the diameter of the electric motor 10 is 3¾ inches. In some embodiments, the outer diameter is 4½ inches or less. In some embodiments, the outer diameter is equal to or between 3¾ to 4½ inches. In some embodiments, the length of the electric motor 10 (including the reservoir, motor head and base) is 40 feet or less. In some embodiments, the length of the electric motor 10 (including the reservoir, motor head and base) is 12 feet or less. In some embodiments, the length of the electric motor 10 (including the reservoir, motor head and base) is 7 feet or less. In some embodiments, the length of the electric motor 10 (including the reservoir, motor head and base) is 6 feet or less. In some embodiments, the length of the electric motor 10 (including the reservoir, motor head and base) is 2 feet or less. As a nonlimiting example, an electric motor may be approximately 3¾ inches in diameter and approximately 2 feet long. As another nonlimiting example, an electric motor may be approximately 4½ inches in diameter and approximately 4 feet long. Motor head 20 and motor base 25 may provide means that allow electric motor to be secured to other components, such as, but not limited to, tubulars, pipes, additional motors, pumps, oil reservoirs, or the like. In a non-limiting embodiment, motor base 25 may be coupled to an oil reservoir and motor head 20 may be coupled to a pump. Further, the oil reservoir, pump, and/or motor may form a sealed compartment filled with lubricating oil for the pump and/or motor. In some embodiments, a motor lubricant chamber may be provided and a separate rotary assembly lubricant chamber may be provided. In some embodiments, the motor lubricant chamber and the rotary assembly lubricant chamber may be combined.

Magnet assembly 30 forms the rotor of electric motor 10. Bearings 35 may be secured in position in motor head 20 or motor base 25 by snap rings 40. Portions of the shaft of magnet assembly 30 pass through the center of bearings 35, snap ring 40, and washer 50. Sensor cable(s) 45 enters the motor and may provide connections to optional sensor(s) for the electric motor 10. Snap ring 55 may secure cable 45 and a seal to motor head 20. As the sensor(s) are optional, in some embodiments, the opening may be filled with a seal with no sensor cable present or the cutout region of the motor head 20 may be omitted. Power cables 60 enter the motor head 20 through an opening 65. While not shown, opening 65 may be sealed by a motor connector, a seal assembly such as shown for the sensor cable(s), or the like.

Figure 2:
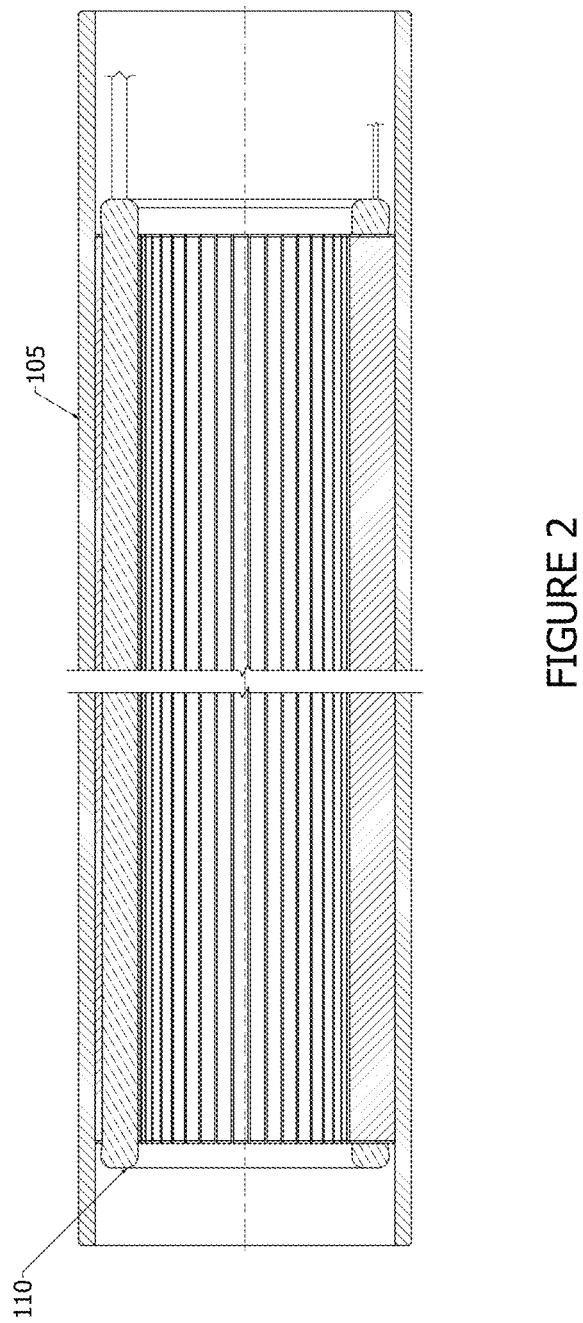
FIG. 2 is an illustrative embodiment of a motor/stator assembly.

FIG. 2 is an illustrative embodiment of a stator/housing assembly. In some embodiments, the motor may provide 12 poles, 39 slots, and 13 coils per phase. In some embodiments, the motor may provide 8 poles, 27 slots, and 9 coils per phase. Motor housing 105 protects stator assembly 110. Stator assembly 110 houses the winding of electric motor 10. In some embodiments, stator assembly 110 may be heat shrunk into motor housing 105. For example, heat shrinking of the stator assembly 110 into the motor housing 105 may be performed at 425° F.±25° F. By heat shrinking stator assembly 110 into the motor housing 105, improved thermal efficiency is provided. As a result of the heat shrinking, surface contact between the motor housing 105 and stator assembly 110 is improved, thereby providing improved heat transfer. Heat shrinking the stator assembly into the motor housing 105 may result in nearly 100% surface contact, whereas other assembly methods result in significantly lower surface contact and less efficient heat transfer. FIG. 3A-3B are illustrative embodiments of a stack 115 of stator assembly 110. Stack 115 may be formed from the lamination of several stacks of material that are shaped to provide a 39 slot configuration. The 39 slots are equally spaced around the diameter of stack 115. Stack 115 may be made of a material that provides beneficial electrical and/or magnetic properties. For example, the stack materials may provide high magnetic permeability, high flux density capability, low eddy current loss, and low hysteresis loss. In a non-limiting example, stack 115 may be formed by bonding laminated stacks (e.g. silicon steel sheets). Bonding the laminated stacks results in increased improved thermal efficiency, interlaminar resistance, and decreased eddy current, thereby resulting in increased efficiency of the electric motor. Slots 120 may be utilized to receive and house the windings of the electric motor. FIGS. 4A-4D are illustrative embodiments of a stator assembly 110. Leads 135 may be coupled to stator assembly 110. Leads 135 may be motor leads providing current to the windings. In some embodiments, leads 135 may optionally include leads for sensors or the like, such as a resistance temperature detector. Slots 120 utilize an open slot design that provides an opening in the slots. Open slot designs eliminate secondary flux paths that reduce torque generation provided by close slot designs. Slots 120 receive the windings of the electric motor. The windings provide a high slot fill, which reduces resistance and provides lower $I^2R$ losses. Slot fill refers to the copper area to slot area utilization ratio. Typical motor winding slot utilization may be approximately 25-35%. In some embodiments, slots 120 may provide slot fill of greater than 35%. In other embodiments, slots 120 may provide high slot fill of 50% or greater. As slots 120 utilize an open slot design, the windings can be wound outside of the slots and placed through the openings in the slots during manufacturing. As a result, the windings can more closely conform to the shape of the slots to provide smaller end turns or protrusion of the winding from the stack 115. By reducing the end turns of the windings, end turn resistance is reduced. Slot liners 125 may be provided within the slots 120 to electrically insulate the windings. Wedge 130 may be provided to secure windings with the slots 120. An outer diameter (OD) as discussed herein refers to the outer diameter of the stator. An inner diameter (ID) as discussed herein refers to the inner diameter of the stator. In the embodiment shown in FIG. 3A, it should be noted that the OD is 3.364 inches, whereas the ID is 2.366 inches. The large ID relative to the OD is beneficial because it facilitates inserting the coils into the slots over a relatively long stack length. By using a larger ID, more torque may be created by the motor and the motor may be more easily manufactured. In some embodiments, the ratio of the OD to ID is 1.42:1 or less. In other embodiments, the ratio of the OD to ID approaches a 1:1 relationship.

Figure 4A:
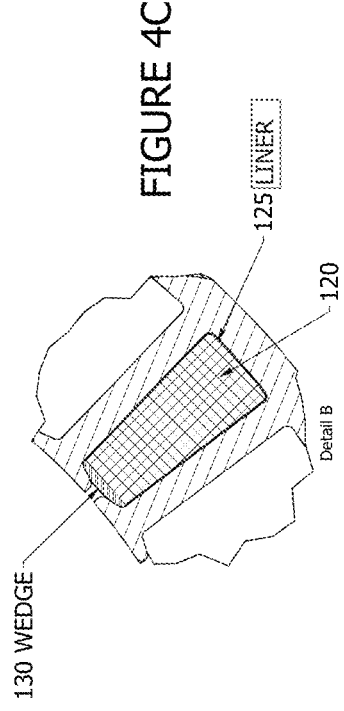
FIGS. 4A-4D are illustrative embodiments of a stator assembly.
Figure 4B:
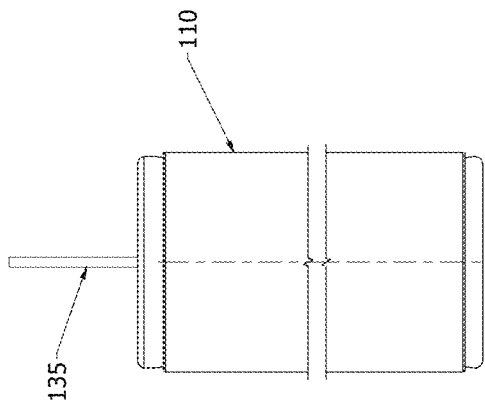
Figure 4C:
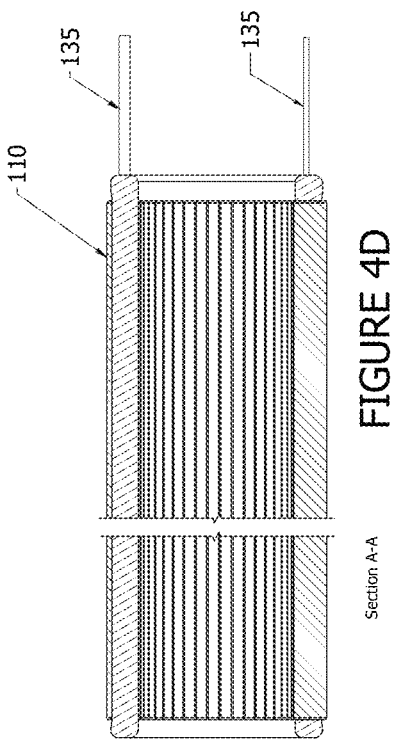
Figure 4D:
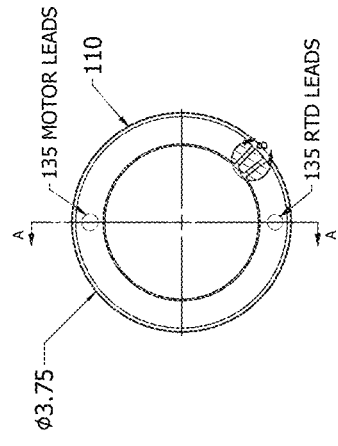
Figure 4E:
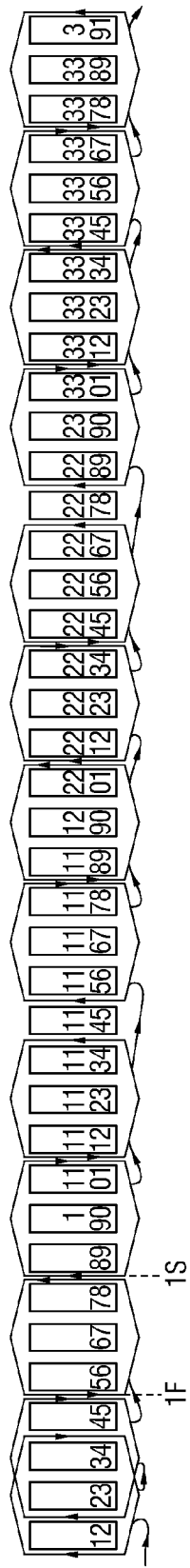
FIGS. 4E-4G are illustrative embodiments of winding diagrams illustrating the three phases of an electric motor.
Figure 4F:
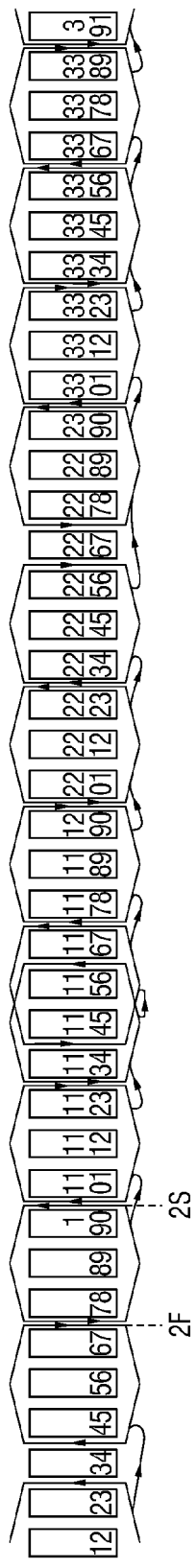
Figure 4G:
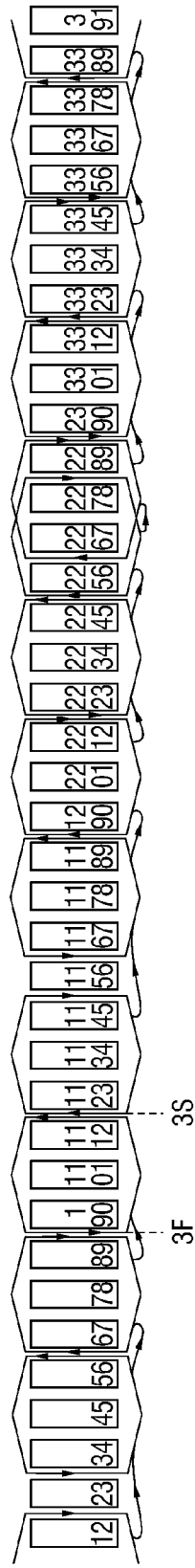

FIGS. 4E-4G are illustrative embodiments of winding diagrams illustrating the three phases of the electric motor. While the motor is a 12 pole motor, a fractional slot design was utilized to minimize the torque that needs to be broken to induce rotation. For example, an odd number of slots and odd number of coils may be utilized. The fractional slot design provides less vibration than an integral slot design. Additionally, the 12 poles provide for more torque generation than similar motors with fewer poles; however, in some embodiments, fewer poles may be provided. In a non-limiting embodiment, 39 slots and 13 coils per phase may be utilized. The winding diagrams each illustrate the 39 slots provided by the stator assembly and the 13 coils per phase.

Figure 5B:
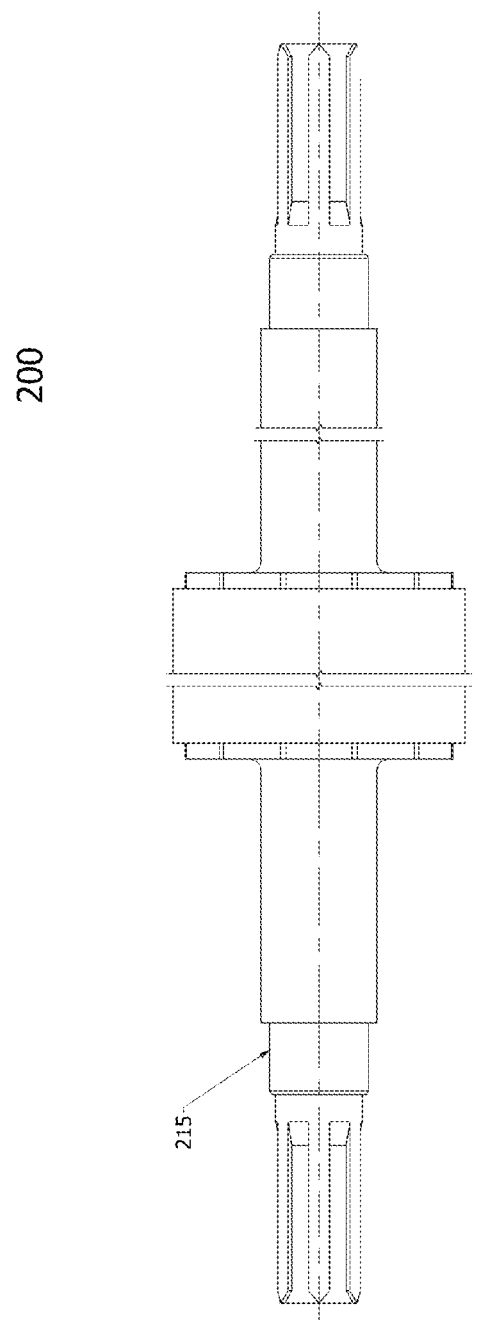
FIGS. 5A-5C are illustrative embodiments of a rotor.
Figure 5A:
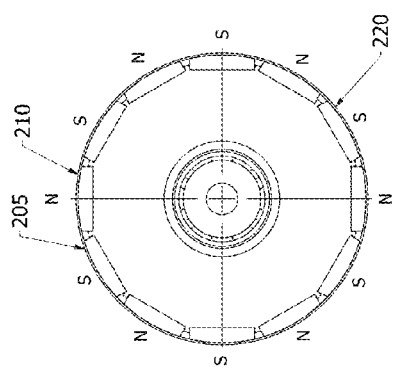
Figure 5C:
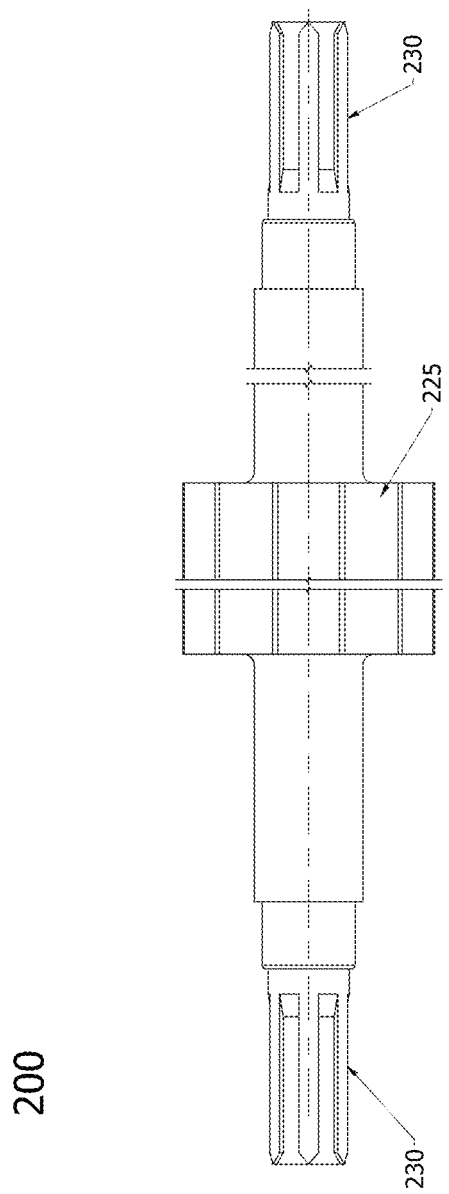

The winding diagrams illustrate arrangement of the 13 coils for each phase and the current direction through the coils. In some embodiments, the windings may be 8-10 gauge. While the embodiment shown provides a 12 pole, 39 slot, and 13 coils per phase, another embodiment may provide 8 poles, 27 slots, and 9 coils per phase. During assembly, the coils may be wound in the internal diameter of the stator. Once the coils are wound, they may be pushed into the slots through the opening in the slots. This minimizes the end turn or distance that the coils extend from the stator, thereby reducing resistance and increasing overall motor efficiency. In other motors, the coil is fed through the slot, wrapped around and sent back through another slot. By winding the coils by feeding through the slot, excess coil extending from the slot is increased, thereby increasing resistance and decreasing overall motor efficiency. FIGS. 5A-5C are illustrative embodiments of a rotor 200. Rotor 200 may provide magnets 205 and 210, a shaft 215, and banding 220. Rotor 200 provides slots 225 for receiving the magnets 205, 210. Magnets 205, 210 are arranged around rotor 200 in an alternating north and south magnetic pole arrangement. In a non-limiting embodiment, 12 samarium cobalt magnets may be arranged around rotor 200. Magnets 205, 210 may be secured to the rotor 200 by any suitable means. In a non-limiting embodiment, magnets 205, 210 may be secured using an adhesive (e.g. Dymax 46733). Additionally, banding 220 may be provided over magnets 205, 210 to retain them in position and/or to prevent damage during operation. In a non-limiting embodiment, banding 220 may be durable non-magnetic material, such as a carbon fiber wrap, non-magnetic stainless steel, or the like. FIG. 5C is an illustrative embodiment of the rotor 200 without the magnets and banding. One or more ends 230 of the shaft 215 may be splined and grooved to allow the motor to be easily mated to other devices. For example, shaft 215 may be mated to a linear pump.

Figure 6A:
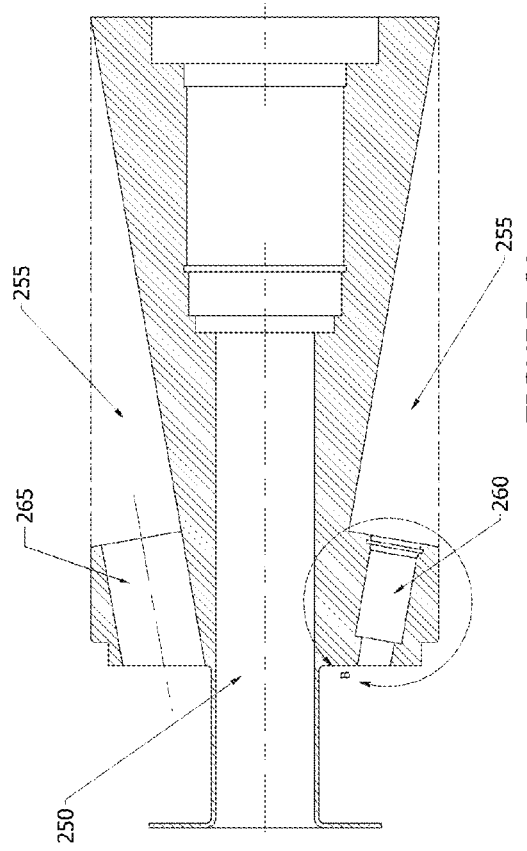
FIGS. 6A-6C are illustrative embodiments of a motor head.
Figure 6B:
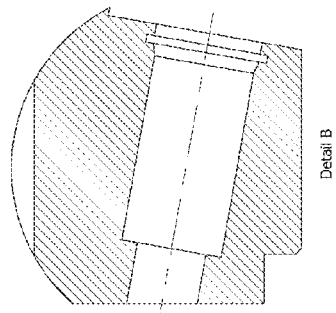
Figure 6C:
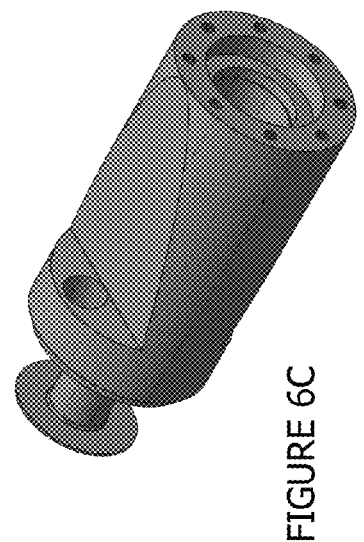

FIG. 6A-6C are illustrative embodiments of a motor head 20. In some embodiments, it may be desirable to connect to an electric motor via motor head 20. Motor head 20 may provide a central opening 250 in which a portion of the shaft of the motor is housed. One or more diagonal cutouts 255 may be provide on the outer diameter of motor head 20. A shoulder of the diagonal cutout 255 may provide one or more openings 260, 265 through which cabling may pass through to the motor. Opening 265 is provided for power cables for the motor. In some embodiments, the opening 265 may be sealed by a seal arrangement or the like. In other embodiments, the opening 265 may be sealed by a connector or the like for the power cable that is inserted into opening 265. In some embodiments, the motor head 20 may optionally provide opening 260 when sensors are desired. Sensor cables may pass through opening 260 to allow connection to optional sensors provided in the motor. As with opening 265, the opening 260 may be sealed with a seal assembly, connector, or the like.

In some embodiments, the continuous loadpoint for an electric motor may be 32 ft-lb at 1200 rpm (50% duty cycle). In some embodiments, the very intermittent case loadpoint may be 50 ft-lb at 1200 rpm. In some embodiments, voltage at motor leads is equal to approximately 380 VAC. In some embodiments, the motor may operate at approximately 10-12 amps under load. As a nonlimiting example, the motor may operate at 380 volts and 10.5 amps under load. As a nonlimiting example, the motor may operate at approximately 961 volts (with 3:1 step up transformer) and approximately 24 amps under load. In some embodiments, the electric motor operates at up to or equal to 3600 rpm. In some embodiments, the electric motor operates at up to or equal to 1200 rpm. In some embodiments, the electric motor is capable of providing 25 ft-lb of torque or greater. In some embodiments, the electric motor is capable of providing 50 ft-lb of torque or greater. In some embodiments, the electric motor is capable of providing 75 ft-lb of torque or greater. In some embodiments, an electric motor may operate with an efficiency of 85% or greater. In some embodiments, an electric motor may operate at an efficiency of 90% or greater. In some embodiments, an electric motor may operate at an efficiency of 95% or greater. As a nonlimiting example, an electric motor may operate at 1200 rpm, provide 32 ft-lb of torque or greater, and/or operate with an efficiency of 90% or greater. As another nonlimiting example, an electric motor may operate at 3600 rpm, provide 73 ft-lb of torque or greater, and/or operate with an efficiency of 95%.

In some embodiments, the electric motor may be suitable for operation at an ambient temperature of 250° F. or less. In some embodiments, the electric motor 300 is suitable for operation in environments of 400° F. or less. In some embodiments, the electric motor 300 is suitable for operation in environments of equal to or between 180° F. to 400° F. In some embodiments, the electric motor 300 is suitable for operation in environments of equal to or between 300° F. to 400° F. In some embodiments, the motor may have a minimum motor life 3.5 years. In some embodiments, the motor may weigh 100 lbs or less. In some embodiments, the motor may be oil filled to dissipate heat.

Figure 7A:
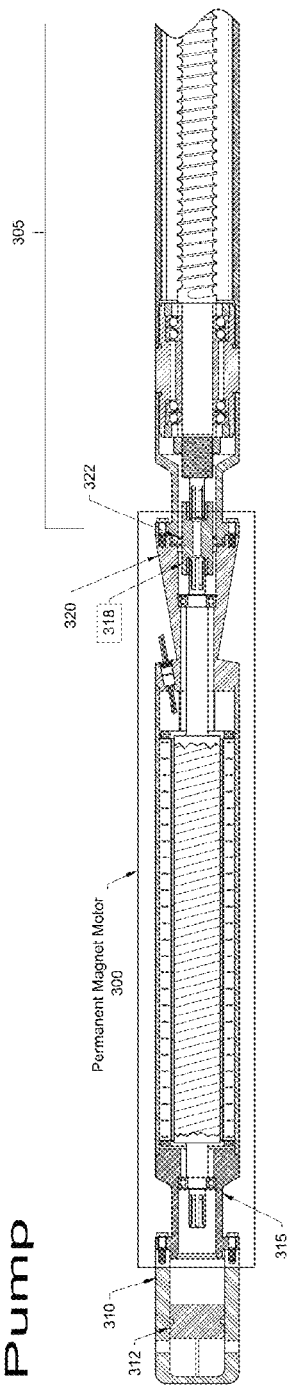
FIGS. 7A-7C are illustrative embodiments of an electric motor attached to a rotary mechanism.
Figure 7B:
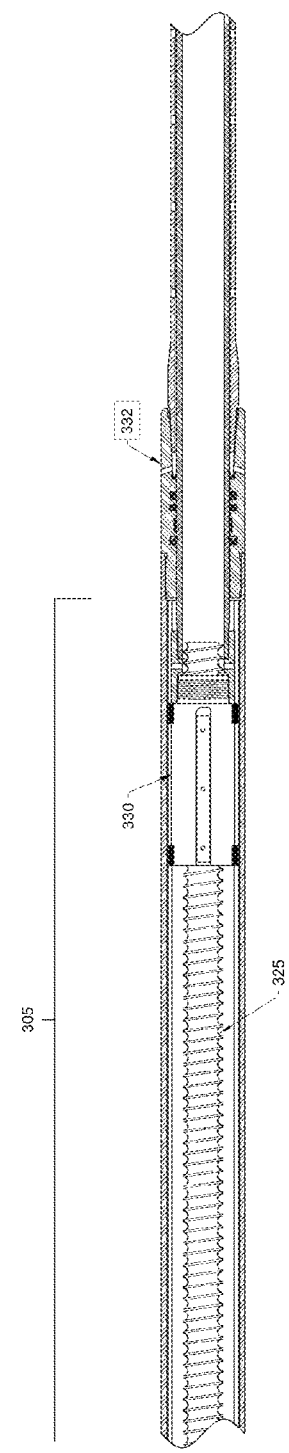
Figure 7C:
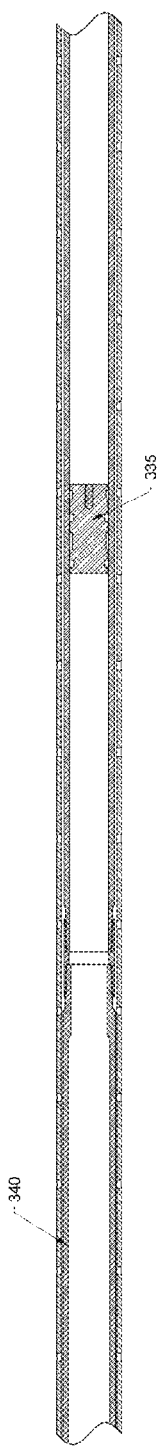

FIG. 7A-7C are illustrative embodiments of an electric motor 300 attached to a rotary mechanism 305. Cap 310 is coupled to the motor base 315 of electric motor 300. The motor head 320 of electric motor 300 may coupled to a rotary mechanism 305. A rotary mechanism 305 is a device that utilizes a rotating component 325 that is driven by a shaft of the electric motor 300. Electric motor 300, cap 310, and/or rotary mechanism 305 may be filled with oil to provide lubrication and beneficial heat transfer. In some embodiments, separate motor lubricant and rotary assembly lubricant chambers may be provided. In some embodiments, the motor lubricant chamber and the rotary assembly lubricant chamber may be combined.

For the purposes of illustration, a non-limiting example of a rotary mechanism 305 is discussed herein. In some embodiments, rotary mechanism 305 may be a rotating component of a linear pump that converts the rotary motion of the electric motor 300 into linear motion. A non-limiting example of a linear pump is provided in copending U.S. Non-Provisional application Ser. No. 14/044,099 titled "Linear Pump and Motor Systems and Methods" to Henry et al. filed Oct. 2, 2013, which is incorporated herein by reference. The rotary mechanism 305 may include a ball screw or rotating component 325 and ball nut 330. Ball screw 325 may be coupled to the shaft of the electric motor 300 by a coupling 318. When electric motor 300 causes ball screw 325 to rotate, ball nut 330 moves along the ball screw 325 depending on the direction of rotation due to the interaction of the threads. The movement of the ball nut 330 may provide the linear motion desired to provide a pumping action, which is discussed in further detail in the abovementioned copending application.

The rotary mechanism 305 may prevent mixing of the oil for the rotary mechanism and external fluids or gases with seals provided by a coupling seals 322, pressure compensation piston 335, thereby providing a rotary mechanism lubricant chamber within the rotary mechanism 305 and tubular 340. Piston 335 may be a shuttle piston that is movable within the tubular to minimize a pressure differential between oil for the rotary mechanism and external fluids. This prevents or minimizes contaminants entering the rotary mechanism lubrication chamber.

Electric motor 300 may also provide a motor lubricant chamber separate from the rotary mechanism lubricant chamber. In the embodiment shown, the lubrication oil provided within electric motor 300 and cap 310 is sealed off from external fluids or gases. Seals provided at a first end by a coupling seal 322 minimize or prevent external fluids from entering electric motor 300 from the first end. Further, a second end of the electric motor 300 provides cap 310 that minimizes or prevents external fluids from entering the second end. In some embodiments, cap 310 may be tubular and may provide a pressure compensation piston 312 to minimize a pressure differential between lubricants for the electric motor 300 and external fluids. One or more seals may be provided on the pressure compensation piston 312 to prevent external fluids from entering electric motor 300. Cap 310 may provide one or more openings that expose one end of the pressure compensation piston 312 to external fluids or gases, whereas the opposite end of the piston is exposed to a lubricant for the motor. The pressure compensation piston 312 may move within cap 310 to minimize a pressure differential between the lubricant in electric motor 300 and external fluids or gases. In some embodiments, the pressure compensation piston 312 may provide an extension that prevents the piston from advancing past the openings in cap 310 when it comes in contact with the cap.

In contrast, electric submersible pumps (ESP) may require a particular production rate for cooling purposes. Lower production rate wells may make such ESP unsuitable for use in these wells, such as when the production rates are not sufficient to properly cool the ESP. Some ESPs operate at 3600 rpm and are not suitable for operation at lower rpm. ESPs do not provide the torque capabilities of the electric motors discussed herein, especially at the length and/or diameters of the motor discussed herein. Further, ESPs have significantly lower efficiencies than the motor discussed herein.

This sealed lubricating oil allows the electric motor 300 and rotary mechanism 305 of the linear pump to operate in an environment where the temperatures are 250° F. or less. In some embodiments, the electric motor 300 is suitable for operation in environments of 400° F. or less. In some embodiments, the electric motor 300 is suitable for operation in environments of equal to or between 180° F. to 400° F. In some embodiments, the electric motor 300 is suitable for operation in environments of equal to or between 300° F. to 400° F. In some embodiments, the electric motor 300 may be suitable for use in deviated wells, horizontal wells, or the like. In some embodiments, the electric motor may be suitable for operation at depths of approximately 10,000 feet or greater. In some embodiments, the electric motor may be suitable for operation at depths of 15,000 feet or less. In some embodiments, the electric motor may be suitable for operation at depths equal to or between 2,500 to 12,500 feet. In some embodiments, the electric motor may be suitable for operation at depths equal to or between 10,000 to 15,000 feet. The electric motor 300 may operate at significantly lower RPMs than ESPs. In some embodiments, the electric motor operates at rpms up to equal to 3600 rpm. The electric motor 300 provides a beneficial reduction in size and weight. In some embodiments, the electric motor 300 may be 7 feet or less in length and/or 4¼ inches in diameter or less allowing for increase ease in navigating well bores. In some embodiments, the electric motor 300 is also capable of providing 50 ft-lb of torque or greater. In some embodiments, an electric motor may operate at an efficiency of 85% or greater. In some embodiments, the electric motor 300 may be 100 lbs or less, which significantly reduces the amount of weight that must be supported by the production string and eases handling. In comparison, some ESP motors are upwards of 14½ feet long and 1000 lbs, and cannot provide the same amount of torque from a similarly sized motor. As a result of the efficiency of the electric motor 300, it may operate using relatively low amperage and voltage. In some embodiments, the electric motor 300 may operate on approximately 10-12 amps. In some embodiments, the electric motor 300 may operate at approximately 380V.

As a nonlimiting example, a first exemplary motor may have a diameter of approximately 3¾ inches and a length of approximately 2 feet. The first exemplary motor may be a 12 pole and 39 slot motor with 13 coils per phase. The first exemplary motor may operate at 380 volts and 10.5 amps under load. The first exemplary motor may provide an operating torque of 32 ft-lb, and an operating horsepower of 7.5. Further, the first exemplary motor may operate at 1200 rpm and provide efficiencies of 85% or greater. The first exemplary motor is suitable for operation in environments of up to 400° F. The first exemplary motor may be suitable for operation at depths equal to or between 2,500 to 12,500 feet.

As a nonlimiting example, a second exemplary motor may have a diameter of approximately 4½ inches and a length of approximately 4 feet. The second exemplary motor may be an 8 pole and 27 slot motor with 9 coils per phase. The second exemplary motor may operate at approximately 961 volts (with 3:1 step up transformer) and approximately 24 amps under load. The second exemplary motor may provide an operating torque of 73 ft-lb, and an operating horsepower of 50. Further, the second exemplary motor may operate at 3600 rpm and provide efficiencies of 95% or greater. The second exemplary motor is suitable for operation in environments of up to 400° F. The second exemplary motor may be suitable for operation at depths equal to or between 2,500 to 12,500 feet.

The electric motor systems discussed herein provides a highly efficient motor as a result of several improvements. Heat shrink fitting of the stator assembly in the motor housing and filling the motor with a lubricant improves thermal efficiency. A high ID to OD ratio and higher pole count improves torque generation. High copper fill and smaller end turns allow for reduced winding resistance. The fractional slot design provides less vibration and easier startup. The open slot design eliminates an undesirable flux path, reduces winding end turns, and improves ease of manufacturing.

Implementations described herein are included to demonstrate particular aspects of the present disclosure. It should be appreciated by those of skill in the art that the implementations described herein merely represent exemplary implementation of the disclosure. Those of ordinary skill in the art should, in light of the present disclosure, appreciate that many changes can be made in the specific implementations described and still obtain a like or similar result without departing from the spirit and scope of the present disclosure. From the foregoing description, one of ordinary skill in the art can easily ascertain the essential characteristics of this disclosure, and without departing from the spirit and scope thereof, can make various changes and modifications to adapt the disclosure to various usages and conditions. The implementations described hereinabove are meant to be illustrative only and should not be taken as limiting of the scope of the disclosure.

What is claimed is:

1. An electric motor for operation in a well, the electric motor comprising:
   a stator providing a plurality of slots, wherein the stator is formed from laminated stack that are bonded;
   a plurality of windings for the plurality of slots of the stator;
   a rotor providing a plurality of permanent magnets arranged around the outer circumference of the rotor;
   a lubrication chamber containing a lubricant for the electric motor, wherein the lubrication chamber is sealed
   wherein further a length of the electric motor is 7 feet or less and an outer diameter of the electric motor is 4½ inches or less, and
   the electric motor is capable of providing 50 ft-lb of torque or greater at 1200 rpm.

2. The electric motor of claim 1, wherein the electric motor provides a fractional slot design.

3. The electric motor of claim 1, wherein the plurality of slots provide an open slot design.

4. The electric motor of claim 1, wherein the electric motor provides 27 slots, 8 poles, and 9 coils per phase or 39 slots, 12 poles, and 13 coils per phase.

5. The electric motor of claim 1, wherein an OD to ID ratio is 1.42 or less, the OD to ID ratio is a ratio of an outside diameter of the stator relative to an inside diameter of the stator.

6. The electric motor of claim 1, wherein a stator assembly comprising the laminated stack is heat shrunk into a motor housing.

7. The electric motor of claim 1, wherein slot fill is 50% or greater.

8. The electric motor of claim 1, wherein the plurality of permanent magnets are samarium cobalt magnets.

9. The electric motor of claim 1, further comprising a banding surrounding the plurality of permanent magnet to retain and protect the plurality of magnets.

10. The electric motor of claim 1, wherein the electric motor weighs 100 lbs or less.

11. The electric motor of claim 1, wherein the electric motor is suitable for operation at depths equal to or between 2,500 to 15,000 feet.

12. The electric motor of claim 11, wherein the electric motor is suitable for operation in environment temperatures equal to or between 180 to 400° F.

13. An electric motor comprising:
   a stator providing a plurality of slots, wherein an OD to ID ratio is 1.42 or less, the OD to ID ratio is a ratio of an outside diameter of the stator relative to an inside diameter of the stator, an outer diameter of the electric motor is 4½ inches or less and a length of the electric motor is 4 feet or less;
   a plurality of windings for the plurality of slots of the stator;
   a rotor providing a plurality of permanent magnets arranged around the outer circumference of the rotor; and
   a lubrication chamber for the electric motor, wherein the lubrication chamber is sealed, wherein further the electric motor is capable of providing 50 ft-lb of torque or greater at 1200 rpm.

14. The electric motor of claim 13, wherein the electric motor provides a fractional slot design.

15. The electric motor of claim 13, wherein a length of the electric motor is 7 feet or less.

16. The electric motor of claim 15, wherein the electric motor is suitable for operation at depths equal to or between 2,500 to 15,000 feet and for operation in environment temperatures equal to or between 180 to 400° F.

17. An electric motor comprising:
   a stator providing a plurality of slots;
   a plurality of windings for the plurality of slots of the stator;
   a rotor providing a plurality of permanent magnets arranged around the outer circumference of the rotor;
   a lubrication chamber for the electric motor, wherein the lubrication chamber is sealed;
   wherein a length of the electric motor is approximately 4 feet, an outer diameter of the electric motor is 4½ inches or less, and the electric motor is capable of providing 50 ft-lb of torque or greater at 1200 rpm; and
   a pressure compensation piston for the electric motor positioned in a tubular chamber, wherein a first end of the pressure compensation piston is exposed to the lubricant and a second end is exposed to external fluids or gases, and the pressure compensation piston is movable within the tubular chamber to minimizes a pressure differential between the lubricant for the electric motor and external fluids or gases.

18. The electric motor of claim 17, wherein the motor operates with an efficiency of 85% or greater.

19. The electric motor of claim 17, wherein the electric motor operates at 380 volts and 10-12 amps under load.

20. The electric motor of claim 17, wherein the electric motor is suitable for operation at depths equal to or between 2,500 to 15,000 feet.

21. The electric motor of claim 20, wherein the electric motor is suitable for operation in environment temperatures equal to or between 180 to 400° F.

\* \* \* \* \*